United States Patent
Suwa et al.

(10) Patent No.: US 7,108,092 B2
(45) Date of Patent: Sep. 19, 2006

(54) FRONT GRILL IMPACT-ABSORBING STRUCTURE FOR A VEHICLE

(75) Inventors: Takaki Suwa, Wako (JP); Kojiro Okabe, Wako (JP); Tatsuo Marushima, Wako (JP); Takashi Abe, Wako (JP); Shigeru Iba, Wako (JP); Yousuke Satoh, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 303 days.

(21) Appl. No.: 10/486,670

(22) PCT Filed: Aug. 9, 2002

(86) PCT No.: PCT/JP02/08166

§ 371 (c)(1),
(2), (4) Date: Feb. 12, 2004

(87) PCT Pub. No.: WO03/024747

PCT Pub. Date: Mar. 27, 2003

(65) Prior Publication Data

US 2004/0195020 A1    Oct. 7, 2004

(30) Foreign Application Priority Data

Sep. 14, 2001    (JP)    ............... 2001-280096
Sep. 14, 2001    (JP)    ............... 2001-280118

(51) Int. Cl.
B60K 11/04    (2006.01)

(52) U.S. Cl. ..................... 180/68.4; 248/232

(58) Field of Classification Search ............... 180/68.4, 180/68.6; 165/67, 68; 296/187.09, 203.02; 248/548, 213.3, 232
See application file for complete search history.

(56) References Cited

U.S. PATENT DOCUMENTS

| | | | |
|---|---|---|---|
| 2,104,723 A * | 1/1938 | Best | 180/68.4 |
| 4,651,839 A | 3/1987 | Isobe | |
| 4,744,411 A * | 5/1988 | Lohmann | 165/41 |
| 4,753,468 A | 6/1988 | Szymczak et al. | |
| 4,766,968 A * | 8/1988 | Matsunaga | 180/68.4 |
| 4,770,234 A * | 9/1988 | Hiraoka et al. | 165/69 |
| 5,435,661 A * | 7/1995 | Zmyslowski et al. | 403/79 |
| 5,477,938 A * | 12/1995 | Tsuji et al. | 180/274 |
| 6,029,345 A * | 2/2000 | Christensen | 29/888.01 |
| 6,260,609 B1 | 7/2001 | Takahashi | |
| 6,675,921 B1 * | 1/2004 | Brown | 180/68.4 |

FOREIGN PATENT DOCUMENTS

EP    1 105 413 A2    6/2001

* cited by examiner

Primary Examiner—Frank Vanaman
(74) Attorney, Agent, or Firm—Hamre, Schumann, Mueller & Larson, P.C.

(57) ABSTRACT

A front grill impact-absorbing structure has a load-transmitting member (90) which retreats together with a front grill (30) when a collision force (F1) acts on the front grill from the front. By the load-transmitting member retreating together with the front grill, the collision force is transmitted to a water-cooled engine radiator (20) inside an engine compartment (11). In the initial state of the collision, the radiator absorbs the collision force and moderates the collision force.

3 Claims, 13 Drawing Sheets

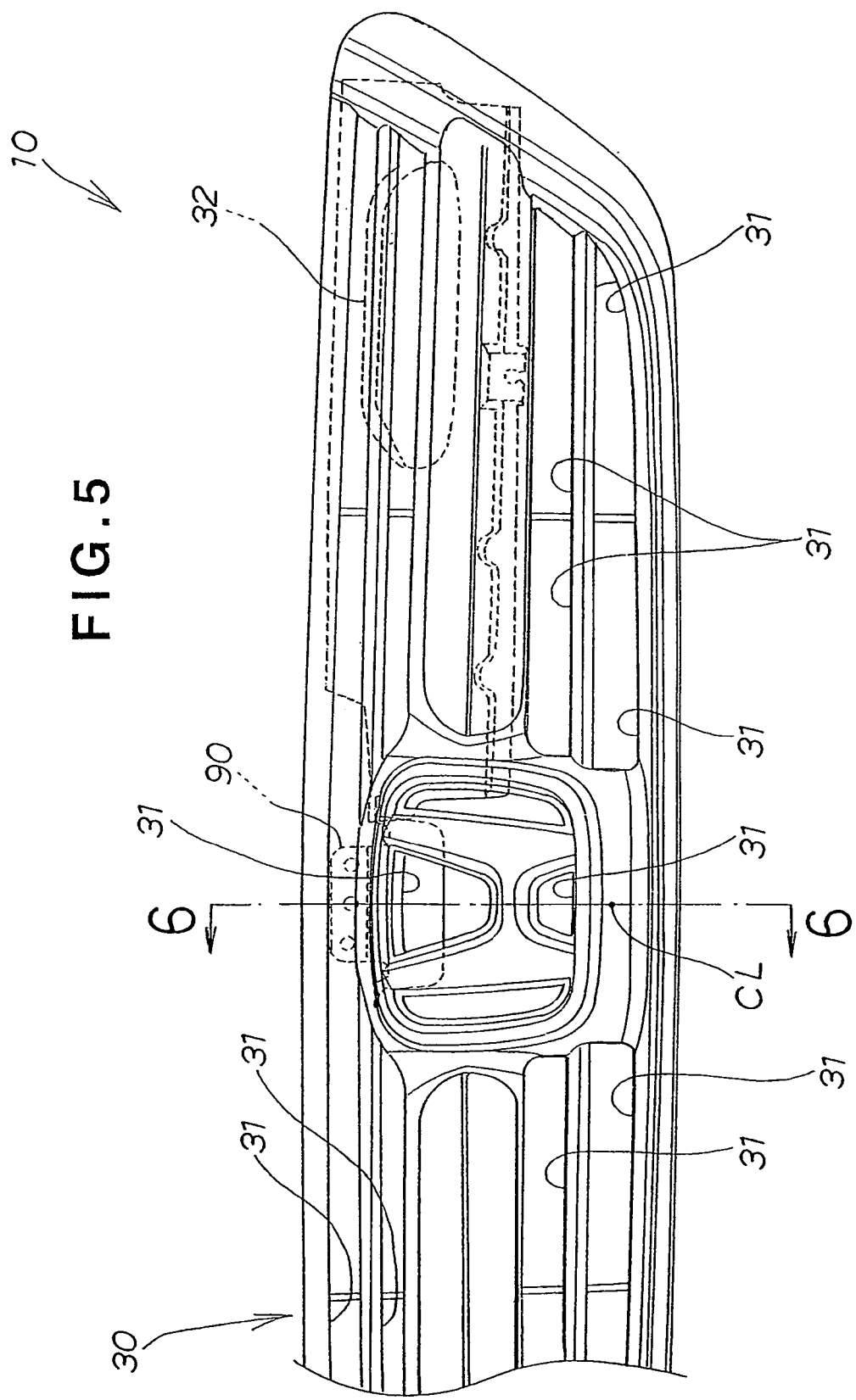

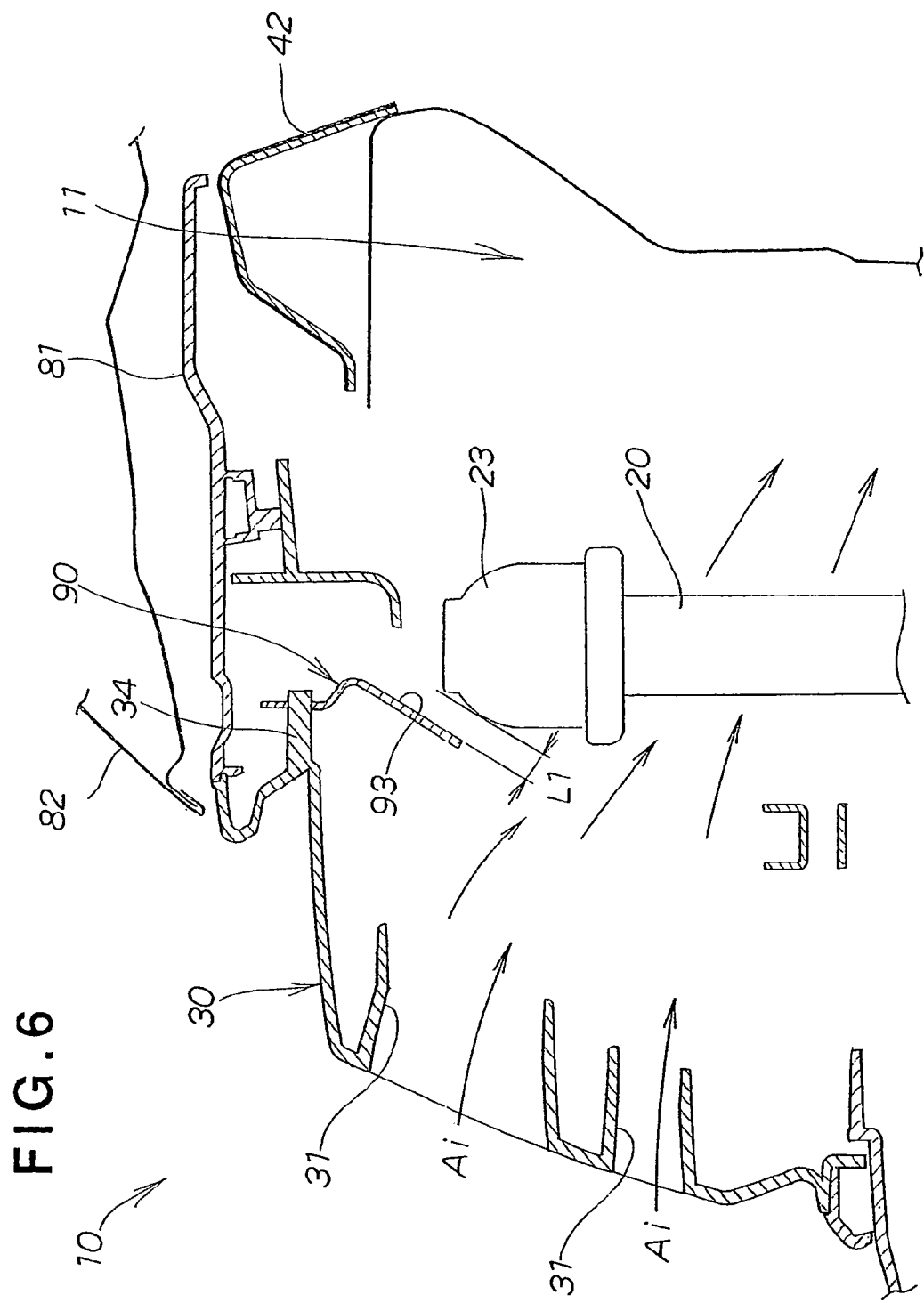

FRONT GRILL IMPACT-ABSORBING STRUCTURE FOR A VEHICLE

TECHNICAL FIELD

This invention relates to the construction of a front part of a vehicle, and particularly to a front grill impact-absorbing structure and an upper mounting structure for a radiator of a water-cooled engine.

BACKGROUND ART

FIG. 12 is a side view of a front part of a vehicle of related art, and shows a front grill 102 covering the front of an engine compartment 101 provided at the front of a vehicle 100, and a water-cooled engine radiator 103 housed in the engine compartment 101 in the rear of the front grill 102.

The water-cooled engine radiator 103 has a lower part 103a attached to a lower front part 105a of a vehicle body frame 105 and an upper part 103b attached by a stay 104 to an upper front part 105b of the vehicle body frame 105. 106 is a hood.

When a collision force F10 acts on the front grill 102 from the front, the front grill 102 deforms in correspondence with the collision force F10; that is, it retreats. By the retreating front grill 102 striking the radiator 103, the collision force F10 is transmitted to the radiator 103. And by the radiator 103 deforming and tilting rearward under the collision force F10, the collision force F10 can to some extent be absorbed.

Now, the distance L10 from the front grill 102 to the radiator 103 is set so that a travel motion draft taken in through the front grill 102 can be guided smoothly to the radiator 103. Accordingly, there is a limit to how small the distance L10 can be made.

On the other hand, for the collision force F10 to be absorbed by the radiator 103 more swiftly and more fully, it is desirable that the collision force F10 be transmitted to the radiator 103 in the initial stage of the front grill 102 retreating under the collision force F10. This is because in this initial stage the collision force F10 is relatively small, and consequently it is possible to protect the various devices inside the engine compartment 101 and also moderate the impact on the obstruction.

The various housed members such as the radiator 103 housed in the engine compartment 101 are disposed like this in positions where their respective capabilities can be secured. With respect to this, the disposition and shape and size of the front grill 102 are decided with matters such as the design of the vehicle 100 overall also being considered. Consequently, there is a limit to how small it is possible to make the distance L10 between the front grill 102 and the various housed members.

Accordingly, there is a need for technology by which, when a collision force acts from the front on the front grill, it is possible to absorb the collision force more swiftly and more fully.

Next, a mounting structure of a radiator of a water-cooled engine of related art will be explained.

Generally, a water-cooled engine radiator disposed at the front of a vehicle is removably mounted to a vehicle body frame. Amounting structure of a water-cooled engine radiator of this kind will now be described on the basis of FIG. 13A and FIG. 13B.

FIG. 13A shows a lower part 201 of a radiator 200 for a water-cooled engine attached to a front-lower part 211 of a vehicle body frame 210, and an upper part 202 of the radiator 200 attached by way of a stay 203 to a front-upper part 212 of the vehicle body frame 210.

More specifically, as shown in FIG. 13B, a mounting structure for the upper part of the radiator has a stay 203 extending rearward from the top face of the radiator 200 and the its end attached to the front-upper part 212 of the vehicle body frame 210 by a bolt 213. By means of the stay 203 it is possible to suppress vertical movement of the radiator 200 and prevent leaning. To enable it to suppress vertical movement of the radiator 200, the stay 203 is a member with a relatively large bending rigidity, provided with multiple vertical ribs 204.

However, in the related art technology described above, because the upper face of the radiator 200 is just supported by the stay 203, there is room for improvement in the degree to which vertical movement of the radiator 200 is suppressed at times such as when the vehicle is traveling on a rough road.

And, when a collision force F10 acts on the front grill 220 from the front, as shown in FIG. 13A, the front grill 220 retreats and strikes the radiator 200, as shown with broken lines in FIG. 13A. As a result, the collision force F10 acts on the stay 203 by way of the radiator 200. And because the stay 203 has a high rigidity, as mentioned above, it can withstand even a large collision force F10. Consequently, the collision force F10 cannot be expected that much to be absorbed by the radiator 200.

For this reason, technology has been wanted by which vertical movement of a water-cooled engine radiator can be suppressed and by which also, when a collision force acts on a water-cooled engine radiator from the front, the collision force can be fully absorbed.

DISCLOSURE OF THE INVENTION

The present invention provides a front grill impact-absorbing structure for a vehicle, characterized in that it has a front grill covering the front of an engine compartment forming the front part of the vehicle; a load-transmitting member provided on the rear side of the front grill which, when a collision force acts on the front grill from the front, retreats together with the front grill; and a housed member, such as a radiator of a water-cooled engine, housed in the engine compartment, and by a collision force acting on the front grill being transmitted to the housed member by the load-transmitting member, the collision force is caused to be absorbed by the housed member.

When a collision force acts from the front on the front grill, the front grill retreats in correspondence with the collision force. And by the load-transmitting member retreating together with the front grill, the collision force can be transmitted to the housed member housed in the engine compartment. In this way, the collision force can be transmitted to the housed member by way of the load-transmitting member in the initial stage of the front grill retreating under the collision force. As a result, the collision force can be absorbed and moderated more swiftly and more fully by the housed member.

Also, the invention provides an upper mounting structure for a radiator of a water-cooled engine characterized in that it has a vehicle body frame; a water-cooled engine radiator disposed at the front of the vehicle body frame; a first stay extending rearward from the top of the water-cooled engine radiator and having its end attached to a front-upper part of the vehicle body frame; and a second stay extending from the top of the water-cooled engine radiator down the side thereof and having its end attached to a front side part of the vehicle body frame swingably in the front-rear direction, and the first stay has a weak part which can be deformed when a collision force acts on the first stay from the front by way of the water-cooled engine radiator.

Because the top of the radiator is supported by both a first stay extending rearward from the top of the radiator and a second stay extending from the top of the radiator down the side, vertical movement of the radiator at times such as when travelling on a rough road can be better suppressed. Also, when a collision force acts from the front on the first and second stays by way of the water-cooled engine radiator, the weak part of the first stay can deform and the second stay can displace rearward by swinging. Consequently, it is easy for the radiator to tilt rearward under the collision force. And by tilting rearward, the radiator can fully absorb and moderate the collision force.

In the radiator mounting structure of the present invention, the first stay and the second stay are preferably a single pressing, substantially L-shaped in plan view, in which they are formed integrally with each other. When the first stay and the second stay are made a single pressing like this, the number of stay parts is reduced and they can be made cheap. Also, because the first stay extending rearward from the top of the radiator and the second stay extending from the top of the radiator down the side are made a single pressing substantially L-shaped in plan view in which they are formed integrally with each other, vertical movement of the radiator can be transmitted more smoothly to the first stay and the second stay. Consequently, the radiator can be supported more stably. Furthermore, a collision force from the front can be transmitted more smoothly from the radiator to both the first stay and the second stay.

BRIEF DESCRIPTION OF THE DRAWINGS

FIG. 5 is a front view of the vicinity of a front grill pertaining to the present invention.

FIG. 6 is an enlarged sectional view on the line 6—6 in FIG. 5.

BEST MODE FOR CARRYING OUT THE INVENTION

Figure 1:
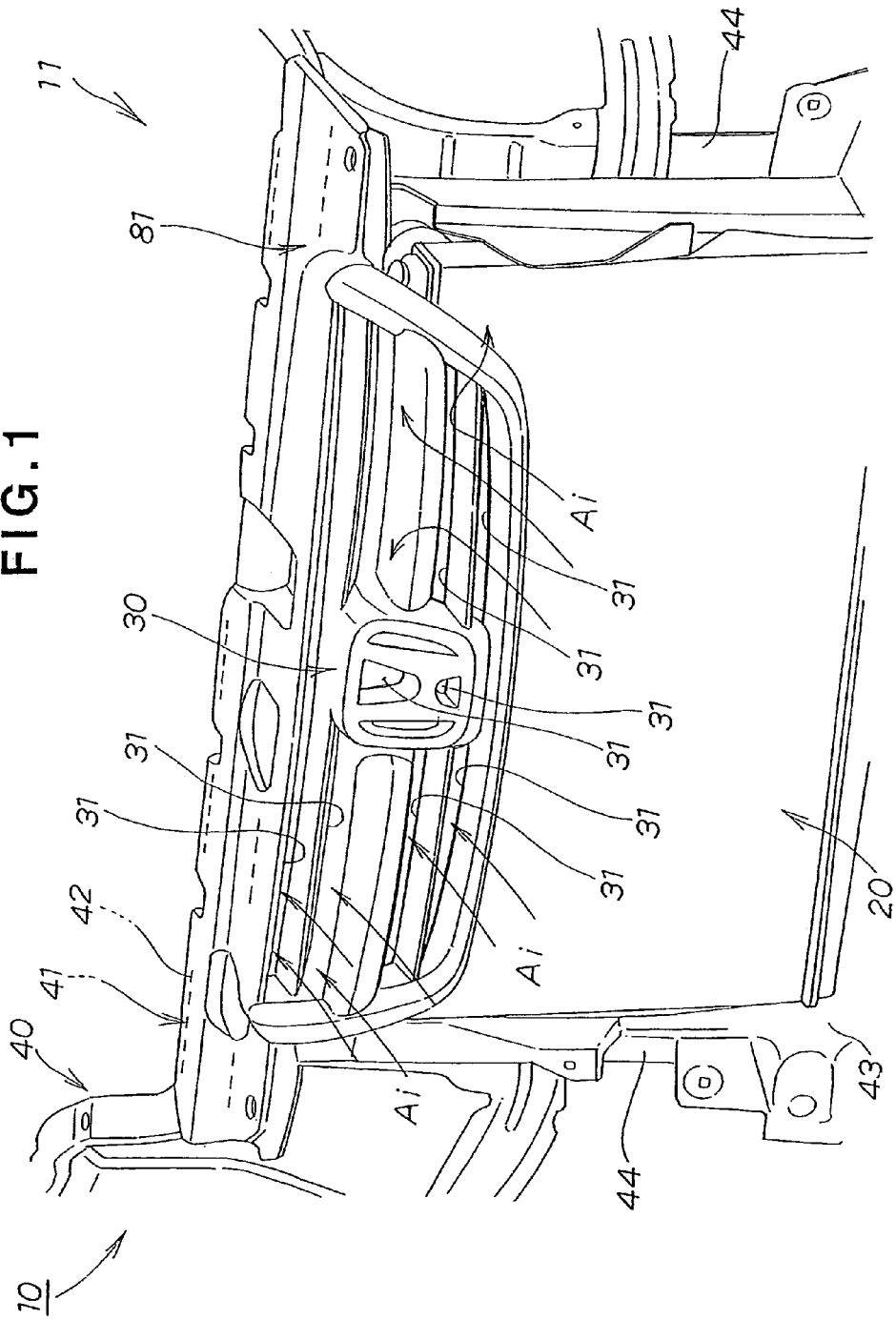
FIG. 1 is a perspective view of the vicinity of a front grill of a vehicle according to the present invention.

FIG. 1 is a perspective view of the vicinity of a front grill of a vehicle according to the present invention, and is a view, seen from the front, of a construction wherein an engine compartment 11 is provided at the front of a vehicle 10; a water-cooled engine radiator 20 (hereinafter simply called "the radiator 20") is disposed at the front of the engine compartment 11 and centrally in the vehicle width direction; and the front of the engine compartment 11 is covered by a front grill 30 made of resin. The radiator 20 takes in from the front through the front grill 30 a travel motion draft Ai created when the vehicle 10 is traveling.

Figure 2:
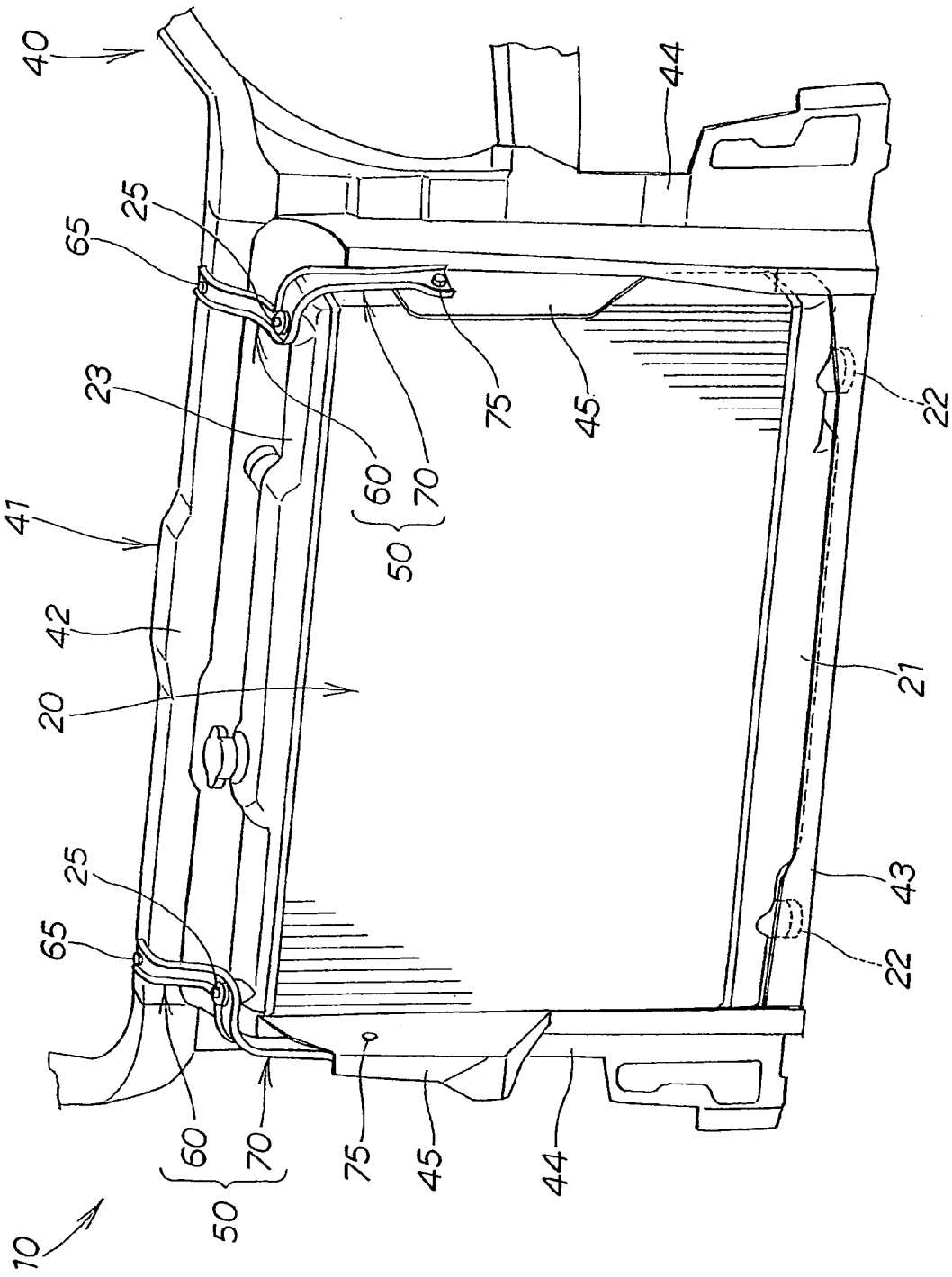
FIG. 2 is a perspective view showing a radiator mounted to a vehicle body frame.

FIG. 2 is a perspective view of a construction whereby a radiator is mounted to a vehicle body frame according to the present invention, and is a view, seen from the front, of a construction wherein a front bulkhead 41 is provided at the front of a vehicle body frame 40 and a radiator 20 is mounted to the front bulkhead 41. In this way, it is possible to dispose the radiator 20 at the front of the vehicle body frame 40.

The front bulkhead 41 is a front member of the vehicle body frame 40, made up of an upper cross member 42 extending in the vehicle width direction at the front-top, a lower cross member 43 extending in the vehicle width direction at the front-bottom, and left and right side stays 44, 44 running between the upper and lower cross members 42, 43.

Explaining now the radiator mounting structure, the lower part 21 of the radiator 20 is mounted to the lower cross member 43 (the front-bottom of the vehicle body frame 40) by way of left and right rubber mounts 22, 22. And, the left and right ends of the top part 23 of the radiator 20 are mounted to the upper cross member 42 (the front-top of the vehicle body frame 40) and to the left and right side stays 44, 44 (the front-side parts of the vehicle body frame 40) by left and right stays 50, 50.

Next, the mounting structure of the left side of the top part 23 of the radiator 20 will be described in detail. Because the mounting structure of the right side is left-right symmetrical with the mounting structure of the left side and otherwise has the same construction, its description will be omitted.

Figure 3:
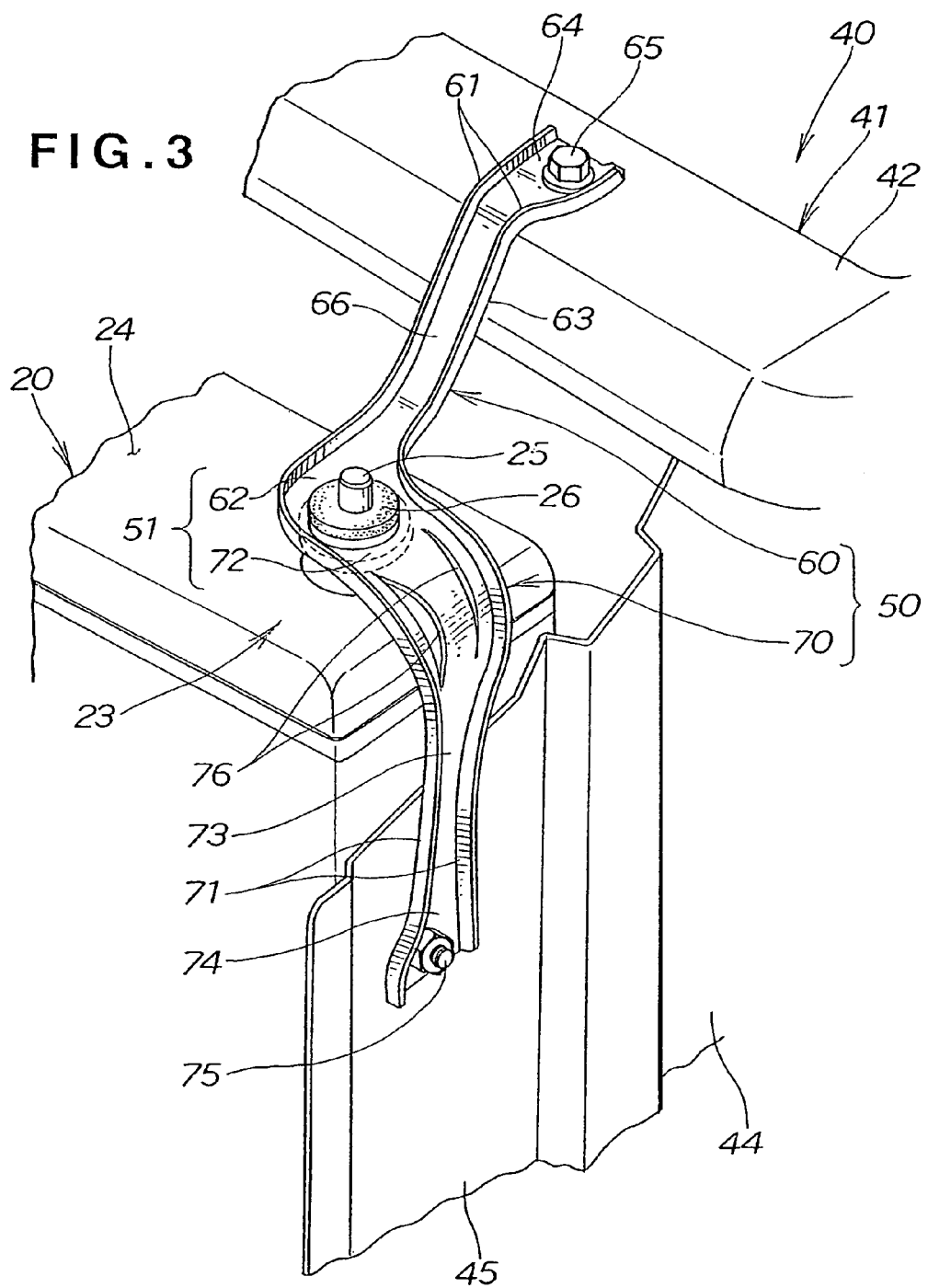
FIG. 3 is a perspective view showing the upper part of a water-cooled engine radiator mounted by way of stays to a vehicle body frame and side stays.

FIG. 3 is a perspective view of a water-cooled engine radiator upper mounting structure according to the invention, and shows the left side of the top part 23 of the radiator 20 mounted to the vehicle body frame 40 by way of a stay 50.

The stay 50 is a pressed single molding made of steel, substantially L-shaped in plan view, wherein a first stay 60 and a second stay 70 are formed integrally with each other.

The first stay 60 is a support member extending rearward from the top part 23 of the radiator 20 and having its end part 64 attached to the upper cross member 42 (the front-top of the vehicle body frame 40). The second stay 70 is a supporting member extending from the top part 23 of the radiator 20 down the side thereof and having its end part 74 attached to a forwardly extending extension part 45 (a front-side part of the vehicle body frame 40) of the side stay 44, swingably in the front-rear direction.

Figure 4A:
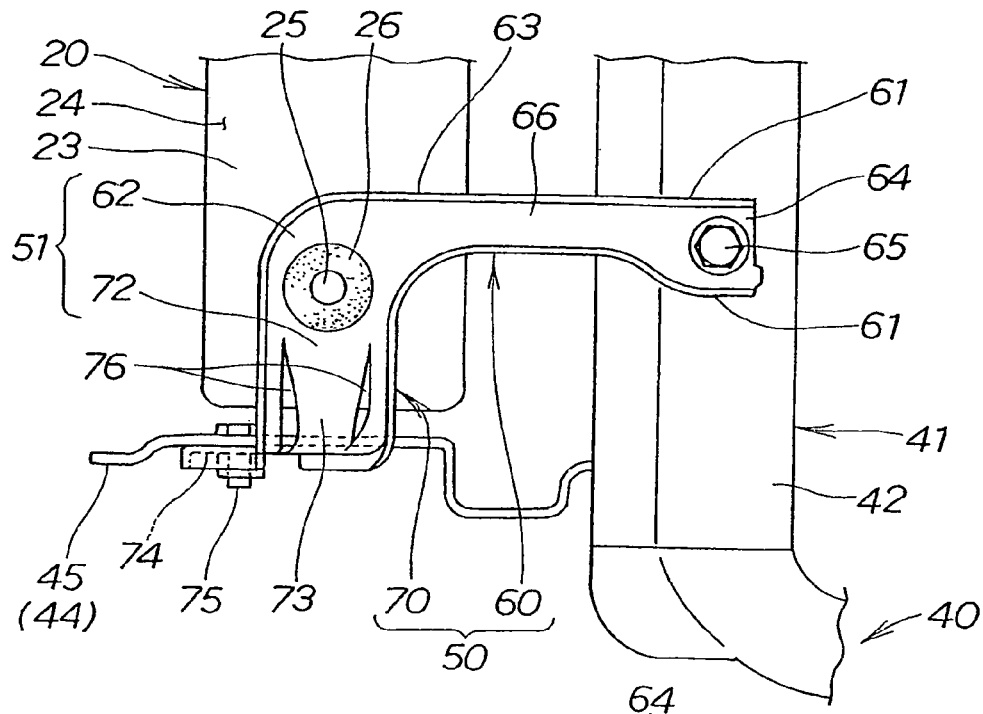
FIG. 4A and FIG. 4B are a plan view and a side view of the radiator upper mounting structure shown in FIG. 3.
Figure 4B:
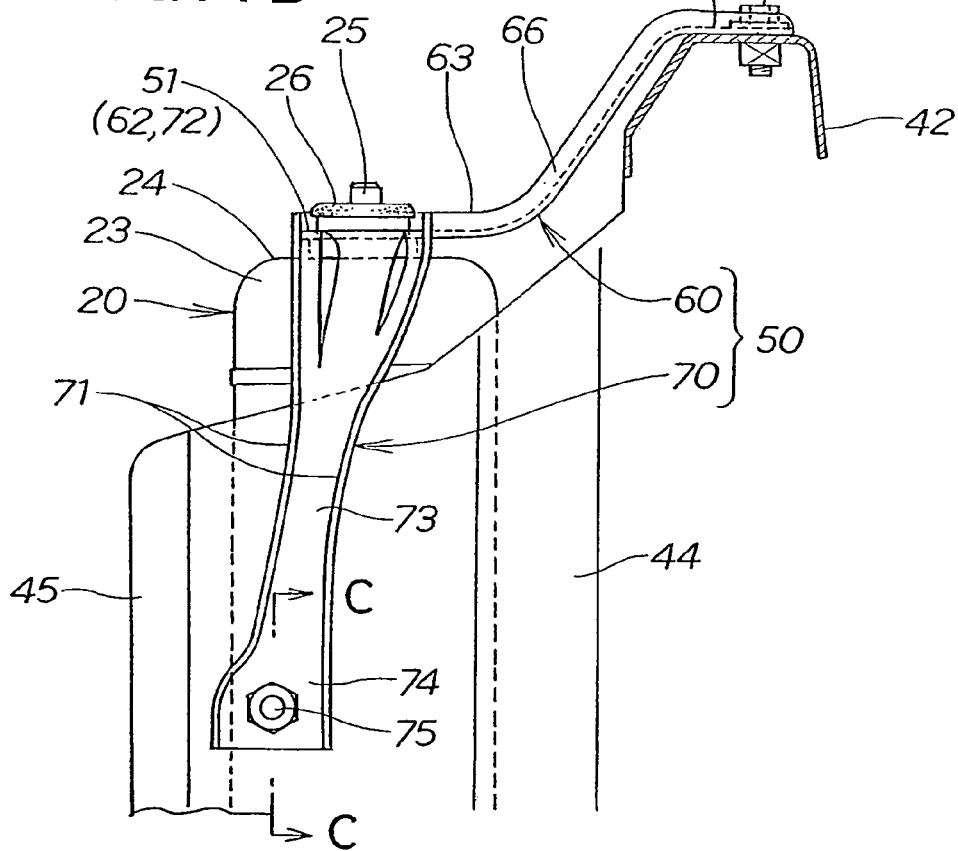

FIG. 4A and FIG. 4B show the upper mounting state of a water-cooled engine radiator seen from above and from the side.

The mounting structure of the stay 50 to the radiator 20 is one in which a support pin 25 extends from the upper face 24 of the radiator 20 and a base part 51 of the stay 50, that is, each of base parts 62, 72 of the first and second stays 60, 70, is attached to the support pin 25 with a rubber mount 26 therebetween by being fitted thereto from above.

The first stay 60 is an upwardly open U-shaped sectional body having ribs 61, 61 formed by bending upward both edges running in the front-rear direction, and is a member having an extension part 63 extending rearward and upward from a horizontal base part 62 and a horizontal end part 64 provided at the rear end of the extension part 63. This end part 64 is superposed on the upper cross member 42 and fastened vertically with a bolt 65.

This first stay 60 has the characterizing feature that it is provided with a weak part 66 capable of deforming (capable of bending) when a collision force acts from the front on the first stay 60 by way of the radiator 20. The weak part 66 is a part of the extension part 63 where its width has been narrowed, as shown in FIG. 4A, and is weaker than the other parts.

The second stay 70 is an outwardly open U-shaped sectional body having ribs 71, 71 formed by bending outward both edges running in the sideward direction, and is a member having an extension part 73 extending down the side of the radiator 20 from a horizontal base part 72 and an end part 74 provided at the lower end of the extension part 73. This end part 74 is superposed on an outer side face of the extension part 45 of the side stay 44 and fixed with a bolt 75. Also the second stay 70 has slits 76, 76 which pass vertically through the corner part between the horizontal base part 72 and the extension part 73.

FIG. 5 is a front view of the vicinity of a front grill according to the present invention, and shows four draft-guiding openings 31 provided in the right half side of this front grill 30, that is, the left side in the figure; two upper/lower draft-guiding openings 31, 31 provided in a vehicle width center CL position; and two draft-guiding openings 31, 31 provided in the left lower half side, that is, in the lower half of the right side of the figure. No draft-guiding openings are provided in the left upper part of the front grill 30 and it is blocked, and an intake opening 32 of an engine intake duct is disposed at this blocked part.

FIG. 6 is a sectional view on the line 6—6 in FIG. 5, and shows the vertical sectional structure around the front grill 30 at the vehicle width center.

This figure shows that in the engine compartment 11, an upper cover 81 extends forward from above an upper cross member 42, and the upper end of the front grill 30 is removably fitted to the front end of this upper cover 81. When the vehicle 10 is travelling, a travel motion draft Ai taken in through the draft-guiding openings 31 in the front grill 30 is guided to the radiator 20. In the figure, 82 is a hood.

Figure 7:
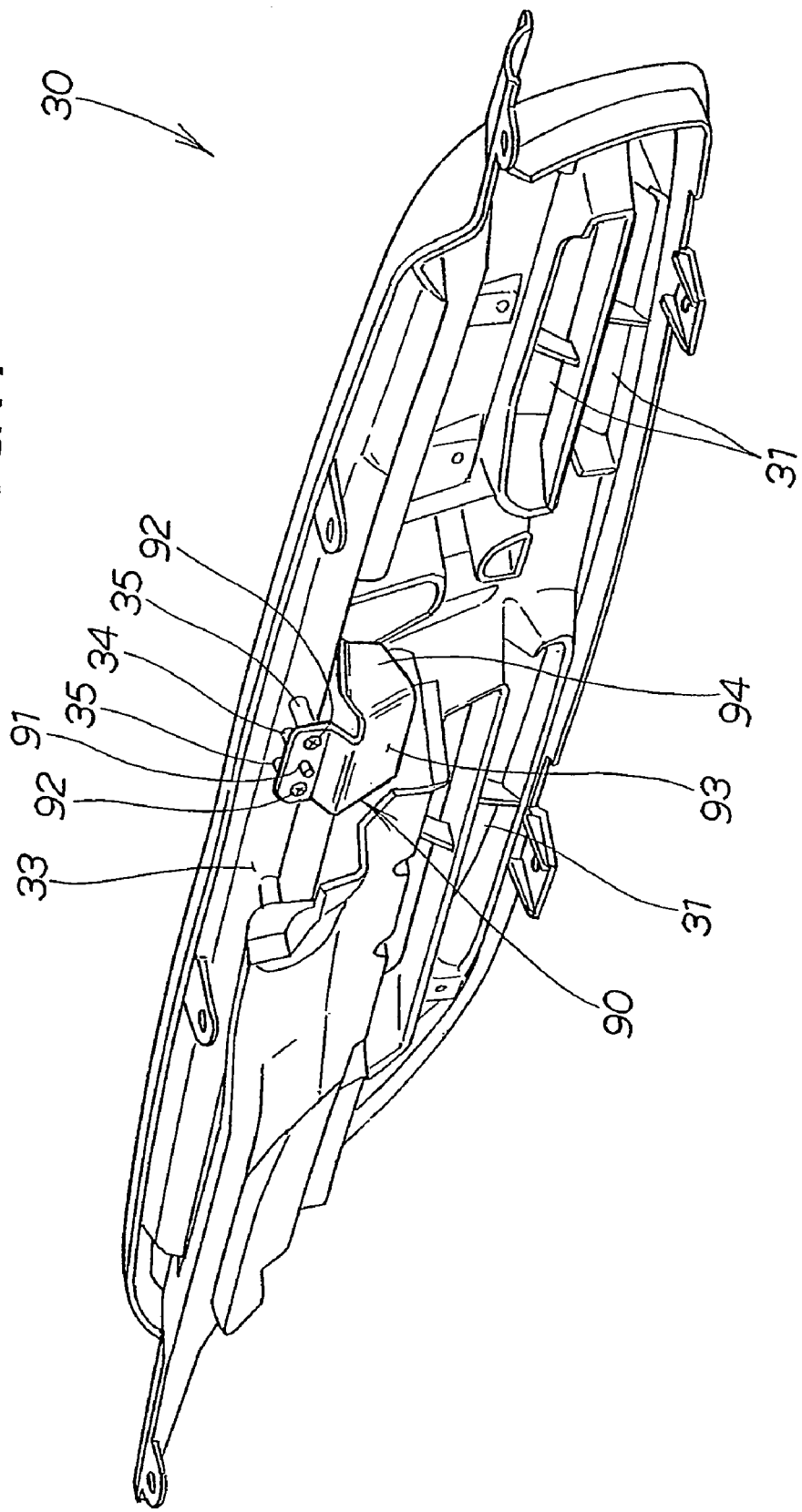
FIG. 7 is a rear side perspective view of the front grill.

FIG. 7 is a perspective rear view of a front grill according to the invention, and shows a load-transmitting member 90 mounted on the rear face 33 of the front grill 30. The load-transmitting member 90 is a member which retreats together with the front grill 30 when a collision force acts from the front on the front grill 30.

More specifically, a central positioning projection 34 and left and right mounting struts 35, 35 of the central positioning projection 34 are formed integrally with the top of the rear face 33 of the front grill 30, centrally in the width direction of the vehicle. The load-transmitting member 90 is mounted to the front grill 30 by a fitting hole 91 in the load-transmitting member 90 being fitted over the central positioning projection 34 to position the load-transmitting member 90, and screws 92, 92 being screwed into the mounting struts 35, 35.

Figure 8:
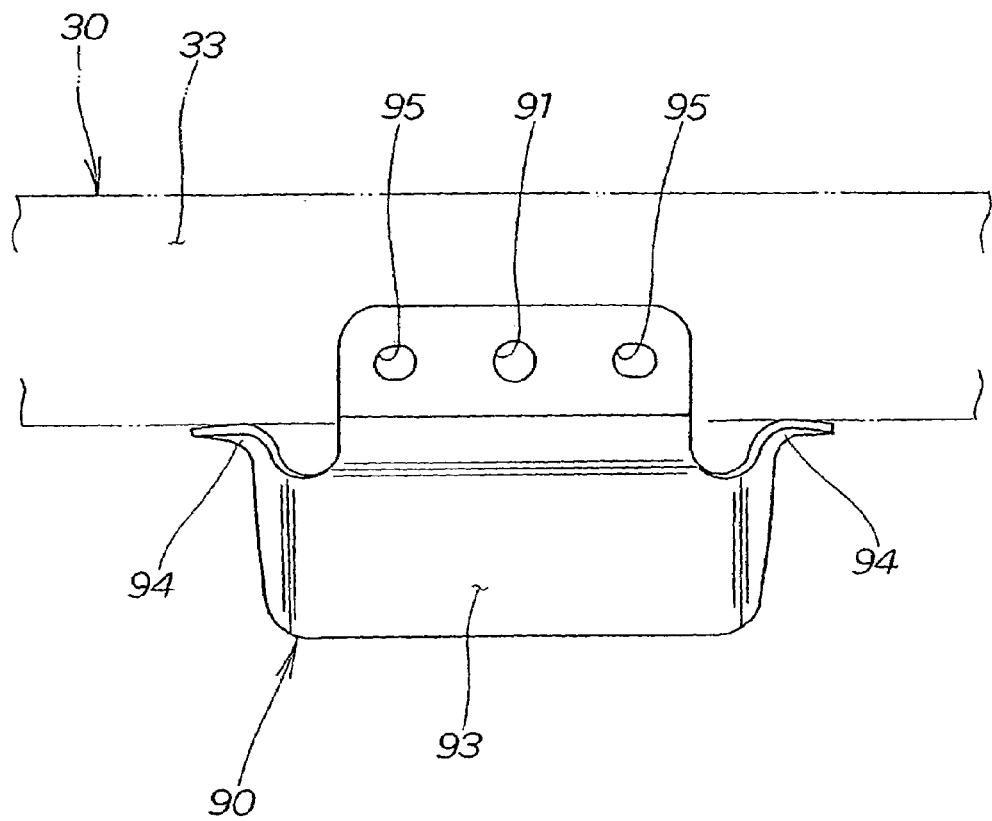
FIG. 8 is a rear side view of a load-transmitting member shown in FIG. 7.

FIG. 8 is a rear view of the load-transmitting member 90 according to the invention, and shows the load-transmitting member 90 disposed on the rear face 33 of the front grill 30, which is shown with broken lines.

The load-transmitting member 90 is a steel press molding in which a flat load-transmitting face 93 inclining forwardly downward and abutting parts 94, 94 extending forward from left and right ends of the load-transmitting face 93 and abutting with the rear face 33 of the front grill 30 are formed integrally. 95, 95 are screw holes for the screws 92, 92 (see FIG. 7).

Here the description will return temporarily to FIG. 6. The load-transmitting face 93 of the load-transmitting member 90 is disposed in a position a distance L1 forward of the top of the front of the radiator 20. The distance L1 is for example about 10 mm.

Next, the operation of the construction described above will be explained, on the basis of FIG. 3 and FIG. 9 through FIG. 11.

Because the top part 23 of the radiator 20 is supported by both a first stay 60 extending rearward from the top part 23 of the radiator 20 and a second stay 70 extending from the top part 23 of the radiator 20 down the side, as shown in FIG. 3, vertical movement of the radiator 20 at times such as during travel on a rough road can be suppressed.

Also, by making the first stay 60 and the second stay 70 a single pressing, it is possible to reduce the number of parts of the stays 50 and make them cheap.

Also, because the first stay 60 and the second stay 70 are made a single pressing, substantially L-shaped in plan view, in which they are formed integrally with each other, vertical movement of the radiator 20 can be more smoothly transmitted to the first and second stays 60 and 70. Consequently, the radiator 20 can be supported more stably.

Figure 9:
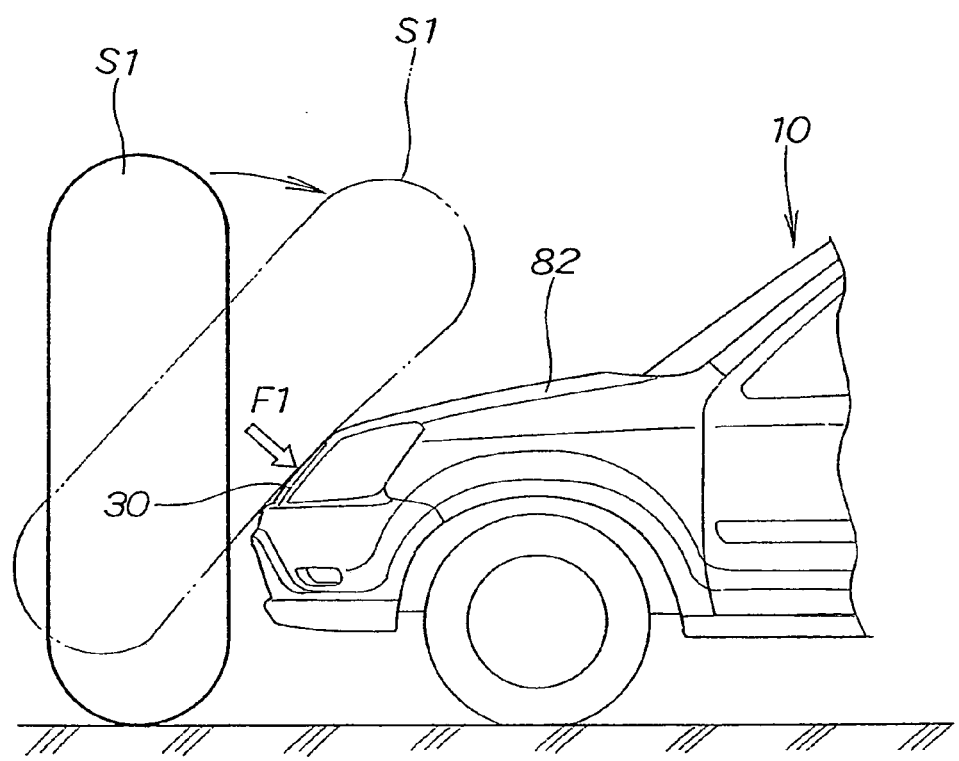
FIG. 9 is a view showing an obstruction colliding with the front grill.

FIG. 9 is an action view of a vehicle according to the invention, and shows the vehicle 10 having collided with an obstruction S1 in front of it and this obstruction S1 having struck the front grill 30. As a result, a collision force F1 acts on the front grill 30 from the front.

Figure 10:
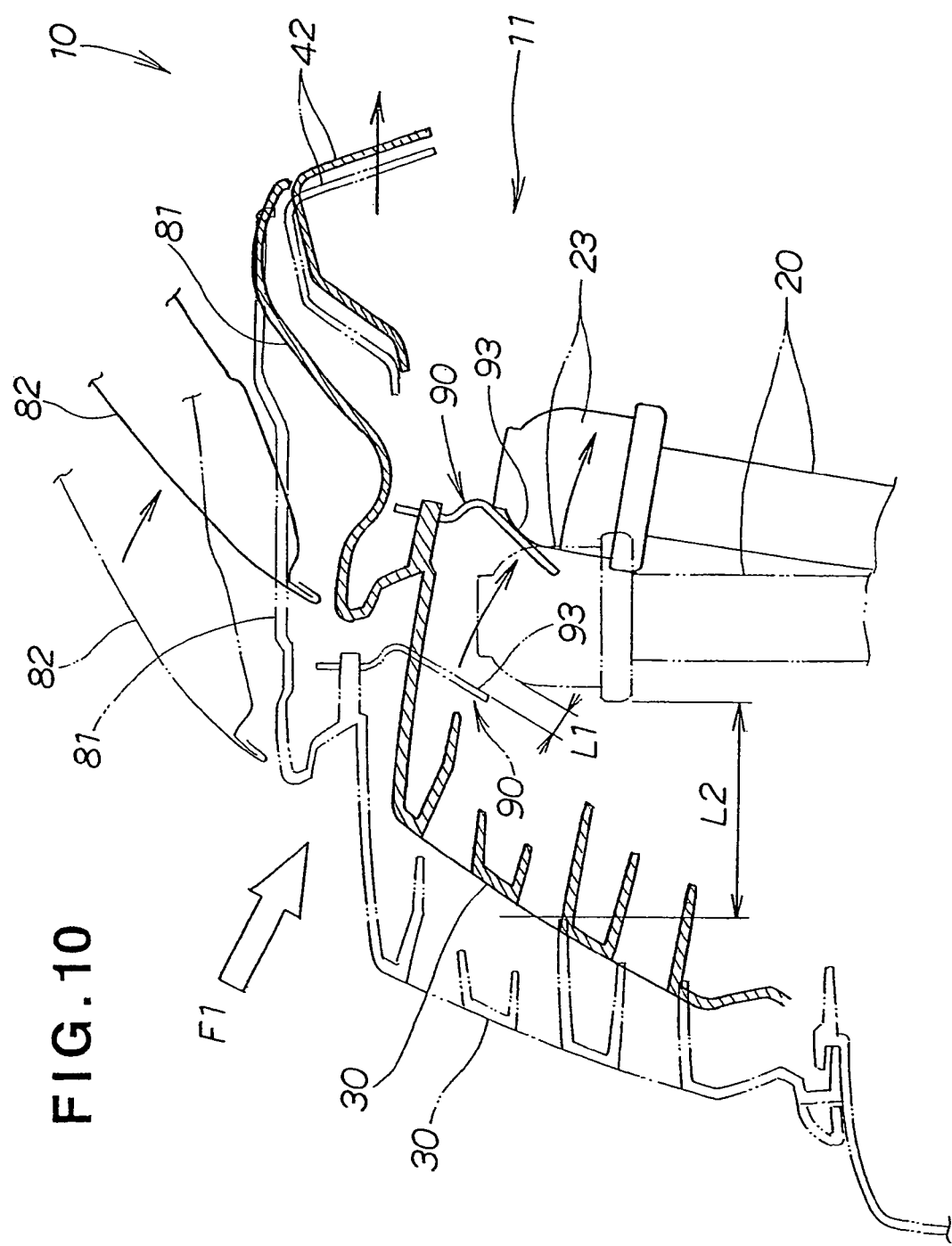
FIG. 10 is a view showing a relationship between a front grill and a radiator at the time of a collision in the case of a front grill impact-absorbing structure according to the invention.

FIG. 10 is an action view of a front grill impact-absorbing structure for a vehicle according to the invention.

When a collision force F1 acts from the front on the front grill 30, shown with broken lines, the front grill 30 deforms in correspondence with the collision force F1; that is, it retreats, as shown with solid lines.

The distance L2 from the front grill 30 to the front of the upper end of the radiator 20 is set so that a travel motion draft taken in through the front grill 30 can be guided smoothly to the radiator 20. Consequently, there is a limit to how small the distance L2 can be made.

With respect to this, in the present invention, the load-transmitting face 93 of the load-transmitting member 90, shown with broken lines, is disposed in a position a distance L1 forward of the front of the upper end of the radiator 20. The position of the load-transmitting member 90 can be set relatively freely, because there are no restrictions of the kind that there are on the positioning of the front grill 30. The distance L1 is extremely small compared to the distance L2, for example 10 mm.

The load-transmitting member 90, which retreats together with the front grill 30, can abut with the front of the upper end of the radiator 20 before the front grill 30 does. Consequently, as a result of the load-transmitting member 90 retreating together with the front grill 30, the collision force F1 can be transmitted to the radiator 20 housed in the engine compartment 11.

In this way, the collision force F1 can be transmitted to the radiator 20 by way of the load-transmitting member 90 in the initial stage of the retreating of the front grill 30 under the collision force F1.

Figure 11:
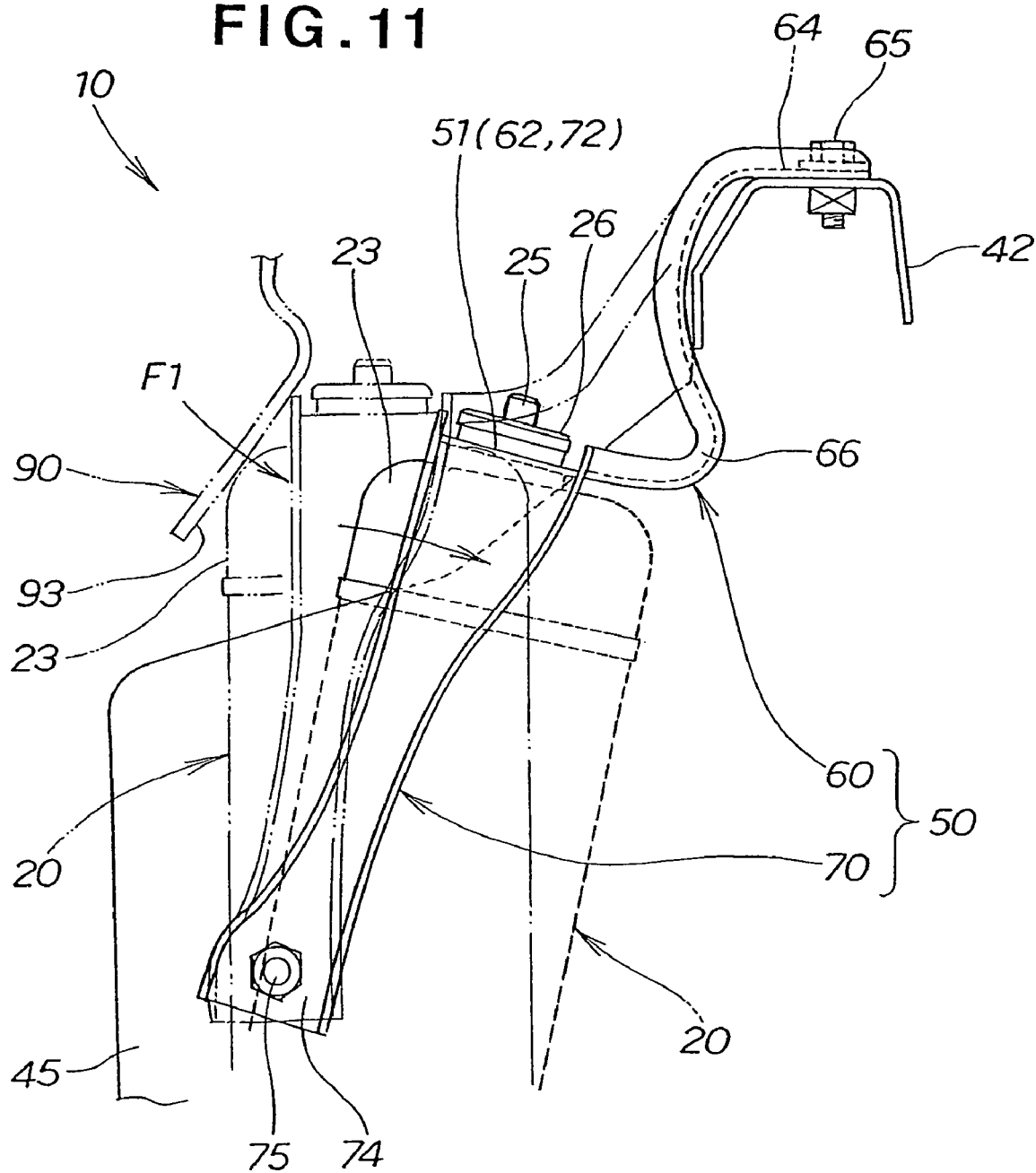
FIG. 11 is a view showing movement of a radiator and a stay at the time of a collision in the case of a water-cooled engine radiator upper mounting structure according to the invention.
Figure 12:
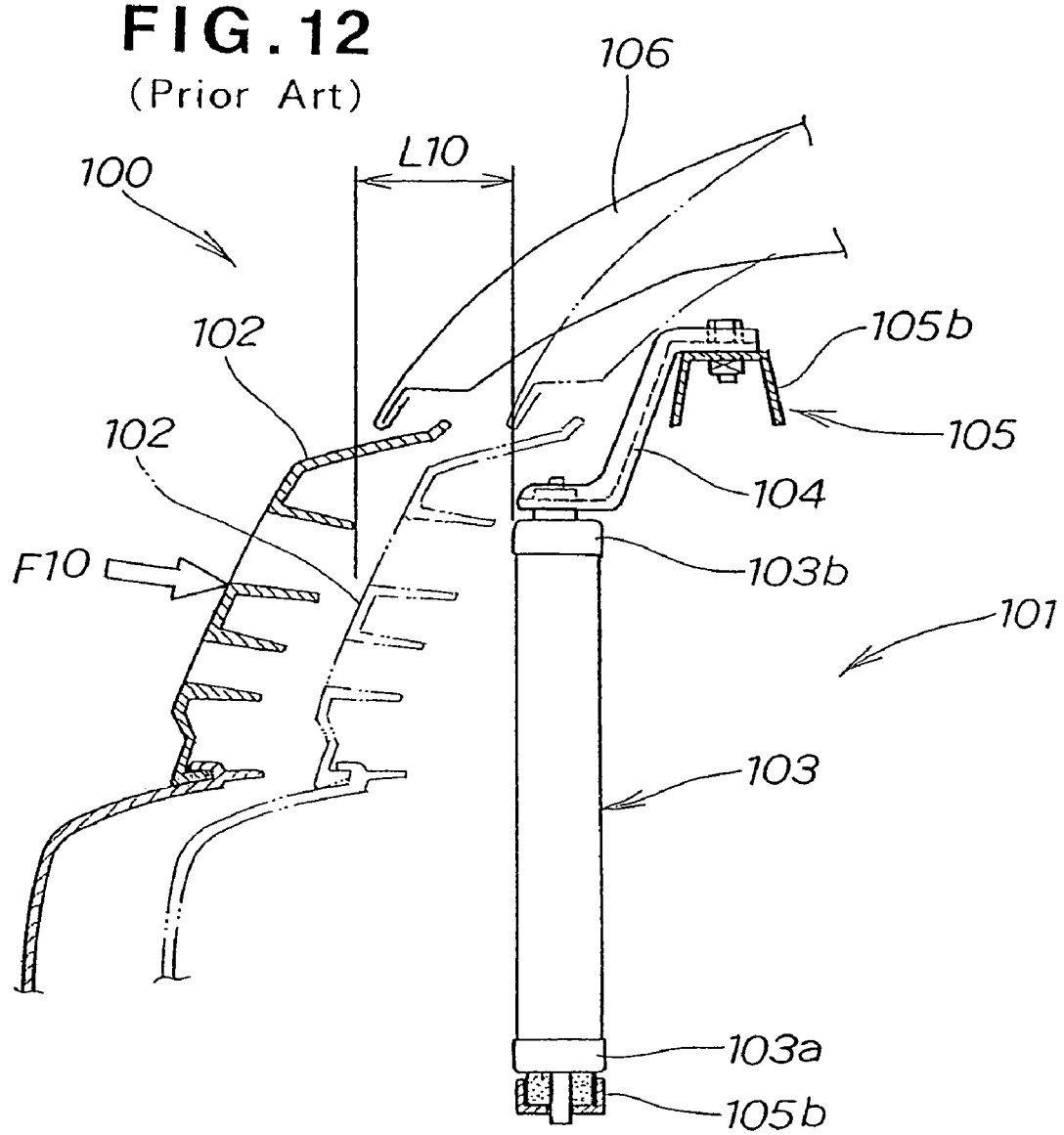
FIG. 12 is an outline view of the front part of a vehicle of related art.
Figure 13A:
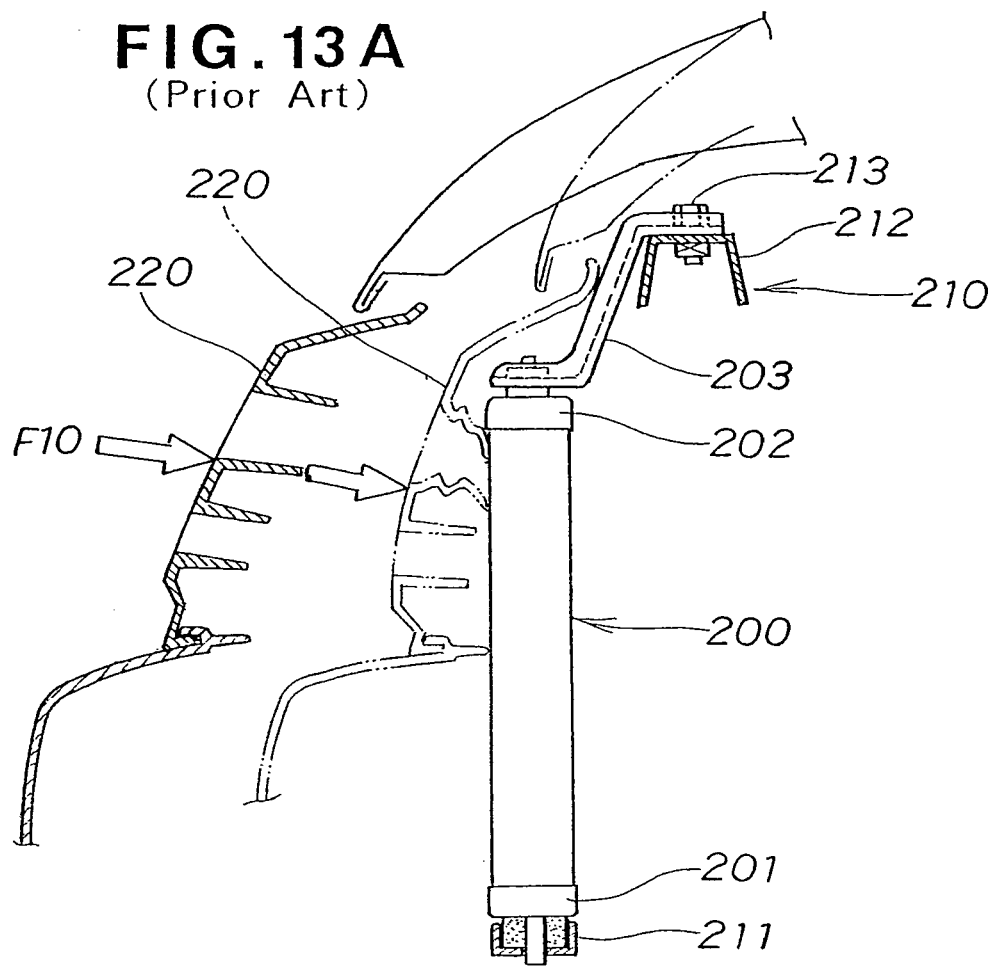
FIG. 13A and FIG. 13B are outline views showing a water-cooled engine radiator mounting structure of related art.
Figure 13B:
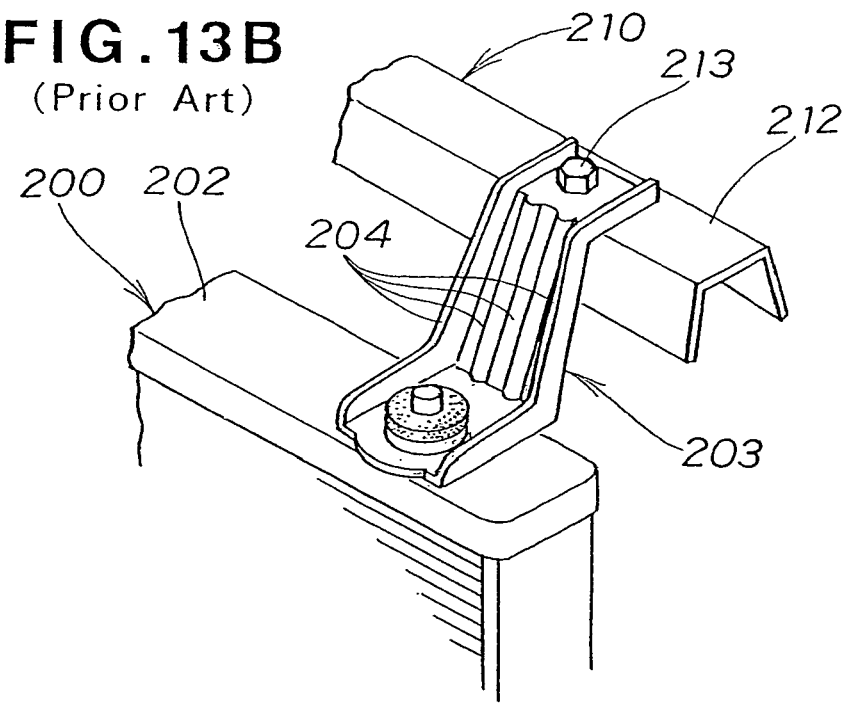

FIG. 11 is an action view of a water-cooled engine radiator upper mounting structure for a vehicle according to the invention, and shows a collision force F1 acting on the radiator 20 as a result of the load-transmitting member 90 abutting with the front of the upper end of the radiator 20.

When a collision force F1 acts on the first and second stays 60, 70 through the radiator 20, the low-rigidity weak part 66 of the first stay 60 deforms rearward in correspondence with the collision force F1.

The end part 74 of the second stay 70 is fixed to the extension part 45 with a bolt 75 extending in the vehicle width direction. Consequently, when a large load such as a collision force F1 acts on the second stay 70 from the front, a load tending to cause the second stay 70 to swing rearward exceeds the surface pressure created by the bolt-fixing. As a result, the second stay 70 can displace by swinging rearward about the bolt 75.

In other words, this becomes possible as a result of the end part 74 of the second stay 70 being front-rear swingably attached to the front side part of the vehicle body frame 40 by means of a stay fixing part (the bolt 75) extending in the vehicle width direction.

As is clear from the foregoing description, in the initial stage of the front grill 30 retreating under the collision force F1, the collision force F1 is transmitted to the radiator 20 by way of the load-transmitting member 90. When the collision force F1 acts on the first and second stays 60, 70, as shown with solid lines, the weak part 66 of the first stay 60 deforms rearward in correspondence with the collision force F1 and the second stay 70 displaces by swinging rearward. Consequently, it is easy for the radiator 20 to tilt rearward under the collision force F1.

By tilting rearward and deforming in the initial stage of the retreating of the front grill 30, the radiator 20 can more swiftly and more fully absorb and moderate the collision force F1. Consequently, the various devices inside the engine compartment 11 can be protected from the obstruction S1 (see FIG. 9), and the impact on the obstruction S1 can also be moderated.

Also, because the first stay 60 and the second stay 70 are made a single pressing, substantially L-shaped in plan view, in which they are formed integrally with each other, a collision force F1 from the front can be more smoothly transmitted from the radiator 20 to both the first stay 60 and the second stay 70.

The rigidity of the weak part 66 of the first stay 60 and the tightening torque of the bolt 75 for making the second stay 70 able to swing rearward should be set appropriately, taking into consideration the collision force F1 that the radiator 20 can absorb.

In the embodiment described above, the weak part 66 provided in the first stay 60 can be any construction which can deform when a collision force F1 acts from the front on the first stay 60 by way of the radiator 20, and may for example alternatively be a thin part, a narrow width, a cutaway or a waist or the like.

And, the construction by which the end part 74 of the second stay 70 is mounted swingably to the front and rear to the front side part of the vehicle body frame 40 can be any such that the second stay 70 can displace by swinging rearward when a collision force F1 acts from the front on the first stay 60 by way of the radiator 20, and besides a bolt-fixing it may alternatively be a pin joint.

Also, the housed member may be any member housed in the engine compartment 11, and besides the water-cooled engine radiator 20 it may alternatively be a capacitor for an air conditioner, the front bulkhead 41 of the vehicle body frame 40 or a front bumper beam.

INDUSTRIAL APPLICABILITY

Thus, with the present invention, by providing on the rear side of a front grill a load-transmitting member which retreats together with the front grill when a collision force acts from the front on the front grill, so that this load-transmitting member transmits the collision force acting on the front grill to a housed member such as a water-cooled engine radiator housed in an engine compartment, this housed member can be made to absorb the collision force. Accordingly, it is possible to transmit the collision force to the housed member through the load-transmitting member in the initial stage of the front grill retreating. As a result, it is possible to absorb and moderate a collision force with a housed member more swiftly and more fully.

Also, with the present invention, because a first stay extends rearward from the top part of a water-cooled engine radiator and has its end part attached to a front-upper part of a vehicle body frame and a second stay extends from the top of the water-cooled engine radiator down the side thereof and has its end part attached to a front side part of the vehicle body frame, so that the top part of the radiator is supported by both the first stay and the second stay, it is possible to suppress vertical movement of the radiator at times such as during travel on a rough road more.

And, with this invention, because a first stay extends rearward from the top part of a water-cooled engine radiator and has its end part attached to a front-upper part of a vehicle body frame and a second stay extends from the top of the water-cooled engine radiator down the side thereof and has its end part attached to a front side part of the vehicle body frame swingably to the front and rear and the first stay is provided with a weak part which can deform when a collision force acts on the first stay, when a collision force acts from the front on a first and second stays by way of the water-cooled engine radiator, the weak part of the first stay can deform and the second stay can displace by swinging rearward. Consequently, it is easy for the radiator to tilt rearward under a collision force. The radiator can fully absorb and moderate the collision force by tilting rearward.

Also, with this invention, by making the first stay and the second stay a single pressing, it is possible to reduce the number of parts of the stays and make them cheap. Also, because a first stay extending rearward from the top of the radiator and a second stay extending from the top of the radiator down the side are made a single pressing, substantially L-shaped in plan view, in which they are formed integrally with each other, it is possible to transmit vertical movement of the radiator to the first stay and the second stay more smoothly. Consequently, the radiator can be supported more stably. Furthermore, a collision force from the front can be transmitted more smoothly from the radiator by both the first stay and the second stay.

The invention claimed is:

1. A water-cooled engine radiator upper mounting structure for a vehicle, comprising:
 a vehicle body frame;
 a water-cooled engine radiator disposed at a front part of the vehicle body frame, the radiator including a lower part mounted to a front bottom of the vehicle body frame;

a stay being substantially L-shaped in top plan view and having a central portion connected to a top part of the radiator, the L-shaped stay including:
  a first stay extending rearward from the central portion and having a distal end portion connected to a front upper part of the front part of the vehicle body frame, the first stay having a weak part that is configured to be deformable to absorb a collision force applied to the first stay through the radiator, and
  a second stay integrally formed with the first stay and extending from the central portion of the L-shaped stay in a lateral outward direction of the vehicle and bent downward along a side of the radiator, the second stay having a distal end portion connected to a front side part of the vehicle body frame by a bolt extending in a widthwise direction of the vehicle such that when subjected to the collision force through the radiator, the second stay tilts rearward about the bolt to thereby allow the radiator to tilt rearward about the lower part thereof.

2. A water-cooled engine radiator upper mounting structure for a vehicle, according to claim 1, further comprising a load-transmitting member provided on a rear side of a front grill of the vehicle such that it transmits a collision force that acts on the front grill to the radiator, the load-transmitting member being spaced a predetermined distance from an upper part of the radiator and, when the collision force is applied to the front grill, the load-transmitting member is engageable with the upper part of the radiator to transmit the collision force to the upper part of the radiator.

3. A water-cooled engine radiator upper mounting structure for a vehicle according to claim 1, wherein the weak part of the first stay is disposed intermediately between the central portion of the stay and the distal end portion of the first stay and has a smaller width than other parts of the first stay.

* * * * *